April 6, 1948.  R. L. WILSON  2,438,983
SPEED CONTROL APPARATUS
Filed Feb. 21, 1945  3 Sheets-Sheet 2
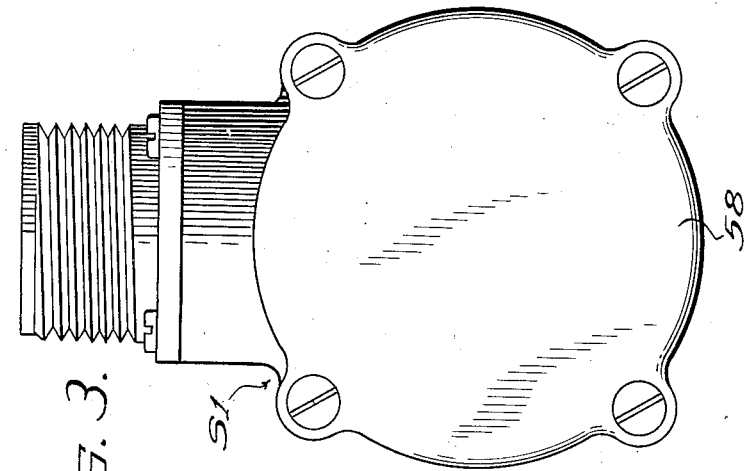
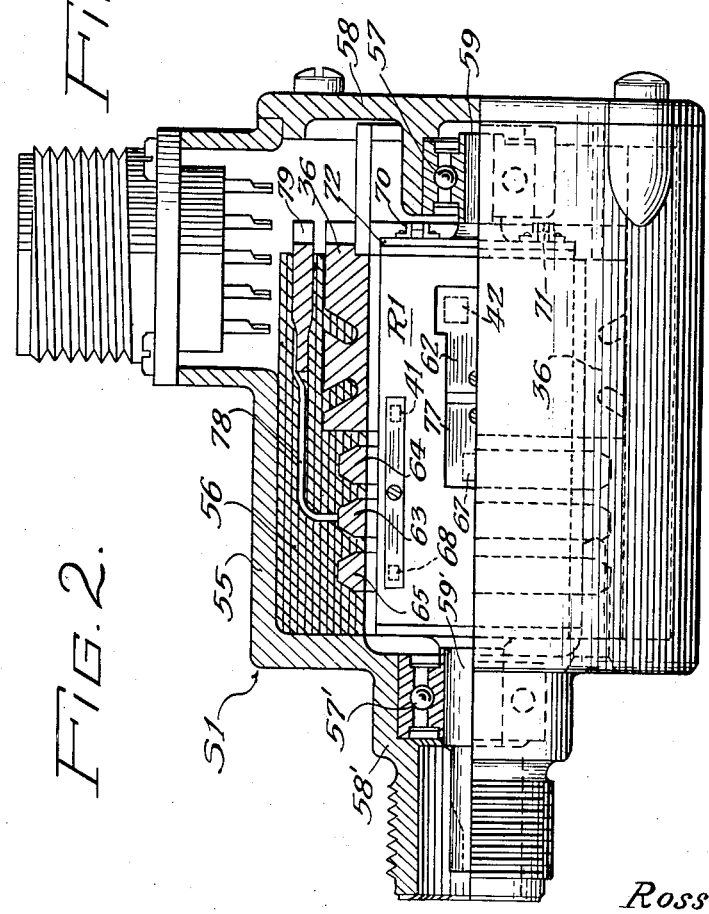
INVENTOR.
Rosser L. Wilson
BY Wallace and Cannon
Attorneys

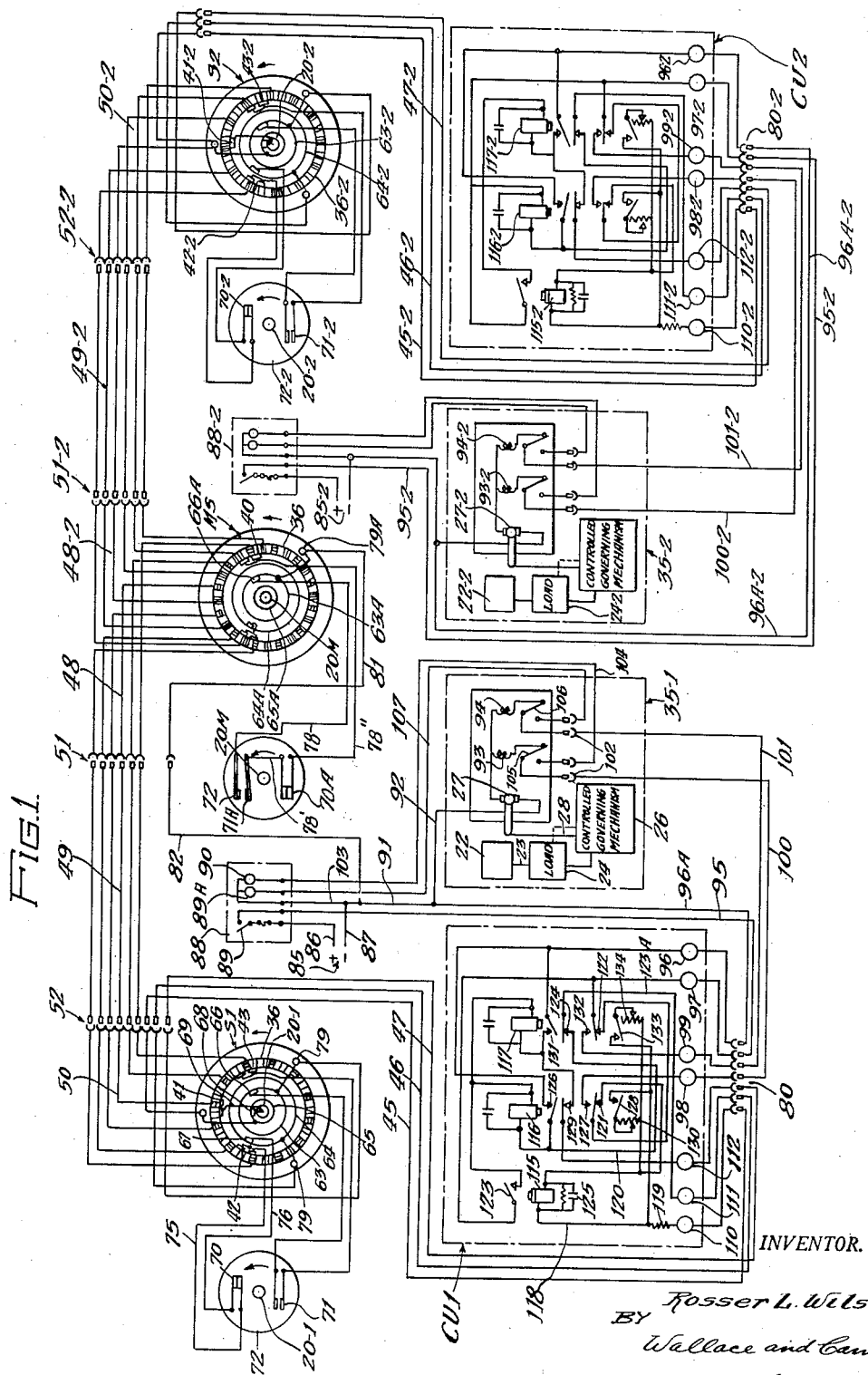

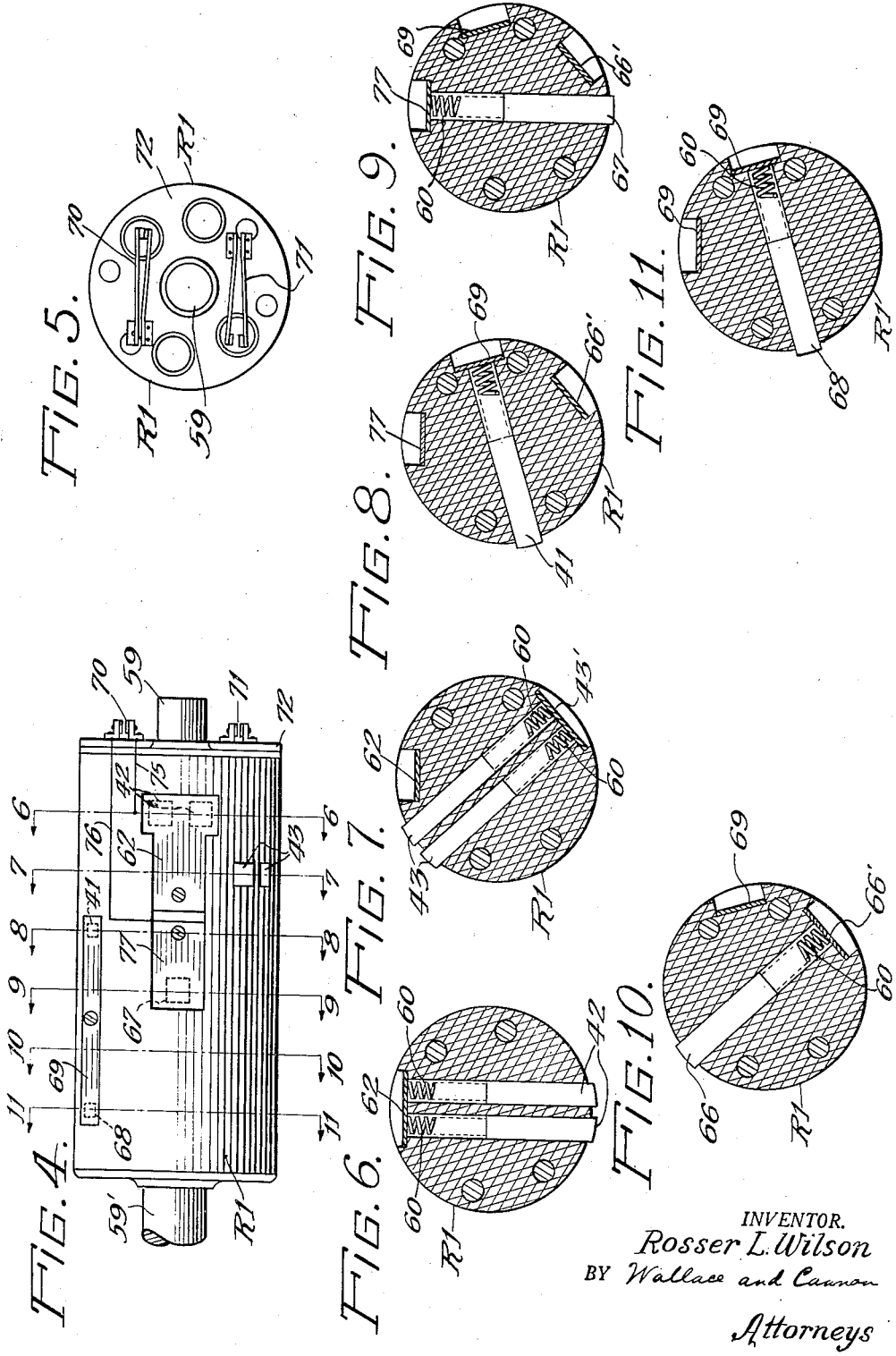

Patented Apr. 6, 1948

2,438,983

UNITED STATES PATENT OFFICE 2,438,983

SPEED CONTROL APPARATUS

Rosser L. Wilson, Mahwah, N. J., assignor to American Brake Shoe Company, New York, N. Y., a corporation of Delaware Application February 21, 1945, Serial No. 579,016

15 Claims. (Cl. 318—74)

This invention relates to control apparatus for use in governing the relative speeds of moving parts of machinery such as shafts and the like, and particularly it relates to such control apparatus for establishing and maintaining a substantially synchronous or other desired speed relationship between two or more such moving parts such as two or more rotating shafts which otherwise would operate independently of each other.

The need for control apparatus of the aforesaid character may arise in any situation where it is desirable that the variantly adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated speed relationship.

The use of one or more engines as the driving power for an airplane affords one typical situation where control apparatus of the aforesaid character is desirable, for whether the airplane be driven by a single engine, or by two or more similar engines, the maintenance of the desired speed of operation of such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a constant speed standard from which the speed of operation of the single engine may be automatically governed by control apparatus of the aforesaid character; while in an airplane having a plurality of engines, such control apparatus may serve to coordinate the speed of all of the engines with the adjusted constant speed of such a variable speed electric motor, or if desired, a particular one of the engines may serve as the variable standard of speed, and such control apparatus may serve to coordinate the speed of the other engines with the one engine which in such an event constitutes the standard or master engine.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patent to Wilson No. 2,232,753, patented February 25, 1941, several forms of control apparatus are disclosed which meet these fundamental requirements; and several improved and more readily adaptable embodiments of control apparatus of the aforesaid character are disclosed in my copending application Serial No. 505,938, filed October 12, 1943.

Control apparatus of the aforesaid character attains the desired speed correlation through the control of power operated speed adjusting mechanism which, upon detection of undesired speed variance, acts to adjust the speed of the secondary shaft or the like in such a sense as to tend to re-establish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

In the control apparatus disclosed in the aforesaid patent, and in the aforesaid copending application, the detection of the undesired speed differential between a master shaft and one or more secondary shafts is accomplished through commutator switch devices associated with the respective shafts so as to compare the speeds of the master and secondary shafts and transmit energizing impulses in succession along different electrical paths to associated relay switch mechanism, and this relay switch mechanism, in accordance with the order or sequence in which such impulses are received from such electrical paths and in accordance with the time spacing of such impulses, is operable to determine whether the speed differential between the compared shafts exceeds the allowable tolerance and in which sense a corrective adjustment must be applied to the secondary shaft to re-establish the desired speed relationship; and upon such determination one or more control impulses are transmitted to the speed adjusting means to cause corresponding periods of corrective speed adjustment in the required direction or sense. The relay switch mechanism of the aforesaid patent and the aforesaid application includes a first or master relay which is of the slow-to-release type, and when a speed differential between the two compared shafts causes this relay to be momentarily energized, the contacts of this master relay remain closed for a predetermined delay period determined by the effective release time of the relay. Two secondary relays are also included in the aforesaid relay switch mechanism, and depending on the sense of the existing speed variance or differential, a circuit to one or the other of the secondary relay may next be closed through the commutator switches. If such circuit closure takes place during the delay period of the slow-to-release or master relay, the corresponding secondary relay will be actuated, and during the balance of the release period of the master relay a control circuit will be completed to the speed adjusting means to cause operation thereof in the proper sense or direction to effect a corrective speed adjustment in respect to the secondary shaft or member.

The maintenance of the speed relationship of a master shaft and a secondary shaft within a predetermined tolerance by control apparatus of the character to which this invention relates is of course dependent upon the ability of the detecting means of such apparatus to detect relatively small variations in the speed relationship of such shafts, to thereby enable correction to be made before the speed differential or variation becomes objectionably large, and in the control apparatus of the aforesaid patent, the sensitivity of the apparatus to small speed differences may be increased by increasing the release time of the master relay of the relay switch mechanism. Under many conditions resort may be had to such increase or other adjustment of the release time of the master or slow-to-release relay to attain the desired sensitivity of the apparatus, but in the application of the control apparatus to different types of mechanism, conditions may arise where the extended period of closure which is necessary for the master relay in order to attain added sensitivity will so extend the period of corrective adjustment as to cause over-correction which cannot be detected until after the master relay has released. In my copending application Serial No. 505,938, an arrangement is illustrated which enables extreme sensitivity of such apparatus to be attained in such a manner that reversal of the sense of relative rotation of two such shafts may be quickly detected, and as there shown, this result is attained in such a way that the normal release time of the master relay in control apparatus of the foregoing character is materially extended without destroying or objectionably limiting the ability of the apparatus to detect reversal of the sense of relative rotation of the two shafts.

Thus, control apparatus of the aforesaid character has as its primary objective the detection and correction of relatively small speed differences, and the construction and relationship of the elements of such apparatus are particularly directed toward that end. In the practical operation of control apparatus of the aforesaid character, the shaft or shafts controlled by the apparatus are normally operated within a predetermined range of speeds, and to attain maximum effectiveness and accuracy of control and attain control within an extremely small tolerance, such control apparatus is usually designed for operation within such normal ranges of variation of speed of the shafts that are to be controlled. Thus in most instances the control apparatus is operative to detect and correct speed differences between the master and secondary shafts before such speed differences become objectionably large. Where, however, the correction of extremely large speed differences is considered to be important, the desired controlling action of the control apparatus may be attained in the control apparatus of my aforesaid patent and application, through appropriate variation in the relative values of the electrical elements thereof, but in attaining such responsiveness to large speed differences, the ability of the apparatus to detect and quickly correct extremely small speed differences is adversely affected.

In view of the foregoing it is the primary object of the present invention to enable control apparatus of the aforesaid character to detect and correct relative speed differences whether such speed differences be large or small, and a related object is to enable sensitivity to small speed differences in such control apparatus to be retained in a degree comparable to that attained in the apparatus of my aforesaid application while enabling such apparatus to detect and correct large speed differences.

Another and more specific object of the invention is to enable control apparatus of the aforesaid character to be constructed so as to be particularly efficient and sensitive within the normal range of operating speeds of the controlled shaft or shafts, and to enable appropriate portions of such control apparatus to function to bring the controlled shaft into this normal speed range. A further object related to the foregoing is to enable the speed of a secondary shaft to be adjusted in response to the speed differential between the master shaft and the secondary shaft when the secondary shaft is within the normal operating speed range and to adjust the speed of the secondary shaft in accordance with its actual speed when such actual speed of the secondary shaft is outside of the normal operating speed range.

A further object is to render the speed adjustment responsive to differential speeds when the two compared shafts are both within the normal operating speed range, and vary the characteristics of the control apparatus in accordance with actual speeds of the compared shafts so that corrective adjustment of the secondary shaft is made in response to the actual speed of the secondary shaft when its speed is outside of said range to bring the speed of said secondary shaft with such normal range, and also to render the apparatus inoperative when the speed of the master shaft is outside of said range.

Other and further objects of the present invention will be apparent from the following description and claims and are illustrated in the accompanying drawings which, by way of illustration, show a preferred embodiment and the principle thereof and what is now considered to be the best mode of applying that principle. Other embodiments of the invention embodying the same or equivalent principle may be used and structural changes may be made as desired by those skilled in the art without departing from the present invention and the purview of the appended claims.

In the drawings:

Fig. 1 is a schematic wiring diagram illustrating a control apparatus embodying the features of the invention and adapted for correlating the speed of one or more secondary shafts with the speed of a master shaft;

Fig. 2 is a side elevational view, partially in section, of a commutator switch which is utilized in the illustrated embodiment of the invention;

Fig. 3 is an end elevational view of the switch shown in Fig. 2;

Fig. 4 is a plan view of the rotor portion of the switch shown in Fig. 2;

Fig. 5 is an end elevational view of the rotor shown in Fig. 4; and

Figs. 6 to 11 are vertical sectional views taken respectively along the lines 6—6, 7—7, 8—8, 9—9, 10—10, and 11—11 on Fig. 4.

In the embodiment of the invention chosen for disclosure herein the invention is particularly adapted for governing the speed on one or more engines of an airplane, but it will be recognized that this embodiment of the invention is of general utility, and may be effectively employed in any circumstance where correlation of the speeds of two or more rotating and independently driven shafts is desired. Thus, in the embodiment of the invention illustrated in Fig. 1 of the drawings, a plurality of shafts 20M, 20—1 and 20—2 are shown, and means are provided for correlating the speeds of these shafts so that one of the shafts, as the shaft 20M, constitutes the master shaft, and the other shafts 20—1 and 20—2 are adjusted to and maintained at speeds which bear a predetermined relationship to the master shaft 20M. This predetermined relationship may, as in the present case, be a substantially synchronous relationship, or, by the use of gearing, any other desired speed relationship between two or more shafts or the like may be maintained.

In the attainment of the desired speed of the several shafts, the master shaft 20M is driven at the desired speed by suitable driving means which may take any desired form such as an adjustable constant speed electric motor or a variable speed engine, and the control apparatus of the present invention is utilized to regulate the speed of the secondary shafts in accordance with the speed of the master shaft. Thus, it is contemplated that the master shaft 20M will serve as a standard or master shaft with which the speeds of the other or secondary shafts 20—1 and 20—2 are to be correlated. The other or secondary shafts 20—1 and 20—2 may be driven by individual variable speed driving means such as the internal combustion engines 22, Fig. 1, which may each take the form of an airplane engine operating through its main shaft 23 to drive a load 24 such as an airplane propeller. The drive from the engine shaft 23 to the related shaft 20—1 may, of course, be direct, or as in the present instance, may be attained through gearing. The speed of each such engine, and hence of the associated shaft as 20—1, may be varied by adjustment of the load or the propeller pitch, or by adjustment of the fuel supply means, and this may be accomplished by operation of conventional speed governing means such as the pitch change mechanism of a variable pitch propeller, or by operation or adjustment of the fuel pump or carburetor of the engine. Thus, in Fig. 1 of the drawings, such governing mechanism is indicated generally as 26, and it is by automatic operation or adjustment of such governing mechanism 26 that the desired correlation of the secondary shaft 20—1 with the master shaft 20M is attained under the present invention. The governing mechanism 26 is, of course, adjustable selectively in one or the other of two directions so as to enable the speed of the secondary shaft 20—1 to be increased or decreased in accordance with the sense of the variance between the speed of this shaft and the master shaft 20M, and such actuation may be effected in different ways, as, for example, by a reversible electric motor 27 having an operating connection 28 with the speed governing mechanism 26.

The mechanism which has thus been described for driving the secondary shaft 20—1, and for adjusting the speed at which the shaft 20—1 is driven, may be said to constitute a driving and speed adjusting unit 35—1 for the secondary shaft 20—1, the elements which make up such unit being clearly indicated in Fig. 1 by being included within a block defined by dot-dash lines and indicated by the reference character 35—1; and a similar driving and speed adjusting unit 35—2, similarly associated with the secondary shaft 20—2 has been illustrated in Fig. 1 by a block bearing such a reference character.

Under the present invention the speed of each secondary shaft as 20—1 is compared with the speed of the master shaft 20M to detect the presence and sense of any undesired variance between the speeds of the secondary shafts and the master shaft, and upon such detection of undesired speed variance in respect to a particular secondary shaft, the speed governing means of the associated engine is adjusted in a controlled manner in the direction required to re-establish the desired speed relationship. In accomplishing such adjustment an individual control unit CU1 is provided which governs the operation of the adjusting motor 27 of the unit 35—1; and a similar control unit CU2 is similarly provided for and associated with the unit 35—2. Such control units CU1 and CU2 are, in turn, associated with detecting means whereby the speeds of the respective secondary shafts are compared with the speed of the master shaft 20M, and such detecting means include a plurality of commutator switches MS, S1 and S2 associated respectively with the shafts 20M, 20—1 and 20—2. Each such commutator switch includes a circularly arranged series of commutator bars 36 and one or more brushes adapted for cooperation with such commutator bars 36. As shown in Fig. 1 the commutator bars 36 constitute the stationary parts of the switches, while the rotative parts of the switches are arranged to include the brushes thereof, and hence the brushes of the respective commutator switches are mounted on the rotors of their switches so as to be driven by the shafts with which their commutator switches are associated. Thus the master commutator MS has a single effective brush 40 driven by the shaft 20M, while the commutator switch S1 has three angularly spaced brushes 41, 42 and 43 driven as a unit from the secondary shaft 20—1. In the present case the master commutator switch MS is structurally a duplicate of the switches S1 and S2, except that brushes corresponding to the brushes 41 and 42 have been removed from the switch MS, the other brush that corresponds to the brush 43 of the switch S1 being retained and serving to afford the master brush 40.

The three brushes 41, 42 and 43 of each secondary commutator switch, as S1, are associated with the related control unit, as CU1, by circuit means including wires as 45, 46 and 47 which are connected to the aforesaid brushes through plug and slip ring connections and special switch devices which will be described later. Selected commutator segments of each secondary switch are so connected with different selected segments of the master commutator MS that when the speed of a secondary shaft varies so as to cause relative rotation to exist between that shaft and the master shaft 20M, circuits will be established to the wires 45, 46 and 47 in a sequence which depends upon the sense of such relative rotation and at a frequency dependent upon the magnitude of such relative rotation. In attaining this result the successive commutator bars 36 of the master commutator MS are allocated in succession to the respective secondary commutator switches and are electrically connected to correspondingly positioned commutator bars of the secondary commutator switch to which they are allocated.

The master commutator switch MS as shown herein is of such a capacity as to be adapted for association with four secondary commutator switches, and where such a master switch is employed, the master commutator bars may be considered as being divided into successive groups each including four commutator bars. Each bar in a group of four bars is adapted to be electrically connected to a corresponding bar of a secondary commutator switch. For example, considering the upper bar 36 just to the right of the vertical center line of switch MS, Fig. 1, it will be noted that this bar is connected by conductors 48, 49 and 50 and plug connections 51 and 52 to a correspondingly positioned commutator bar 36 of the secondary switch S1. Similarly, the third commutator bar 36 to the right of the vertical center line on switch MS, Fig. 1, is electrically connected to a corresponding bar 36 on the secondary commutator switch S2. If two additional secondary switches were being utilized, connections would be traced in a similar manner from the second and fourth bars 36 in this group of four bars to corresponding bars on such secondary switches. Preferably, each commutator bar on each of the master and secondary switches is electrically connected by a fixed conductor (not shown) to the commutator bar situated diametrically opposite from it on the same switch.

The construction of a typical commutator switch as employed in the present embodiment of the invention is illustrated in detail in Figs. 2 to 11 inclusive. For convenience, it will be assumed that the secondary commutator switch S1, Fig. 1, is illustrated in these views. The switch S1 comprises a stationary portion including the housing 55 and the switch stator 56, Fig. 2. Bearings 57 and 57' which are respectively carried by an end plate 58 and within a nipple 58' on the housing, support a switch rotor generally designated R1, Figs. 2 and 4. In affording such support, the rotor R1 has mounting stub shafts 59 and 59' that extend axially from opposite ends of the rotor, and these extending stub shafts are received in the bearings 57 and 57' so that the stub shaft 59' projects beyond the bearing 57' for connection with a shaft such as the secondary shaft 20—1, which has been referred to previously in connection with the description of the apparatus shown in Fig. 1. The construction of each of the commutator switches MS and S2 is identical to that of the illustrated switch S1 with certain exceptions which will be pointed out hereinafter.

Referring again to Fig. 1, it will be seen that the brushes 41, 42 and 43 are arranged to cooperate with the annular series of commutator bars 36, and as shown in Fig. 2, the bars 36 are embedded in the insulating material of which the stator 56 is formed, and are of sufficient length so that the brushes 41, 42 and 43 which cooperate therewith may be arranged in spaced relation to each other longitudinally of the rotor R1. These brushes are shown in the sectional views Figs. 6, 7 and 8. Each of these brushes is slidably mounted in a brush socket which extends diametrically through the insulating material of which the rotor R1 is constructed. Springs 60 mounted in these brush sockets yieldingly urge the brushes radially outwardly and against the contact surfaces of the commutator bars 36, Figs. 1 and 2. Each brush, as 42, is electrically connected to a metallic contact plate as 62, Figs. 4 and 6, the electrical connection being afforded by the springs 60, as herein shown, or through pigtail connections which may be provided if desired. Slip rings 63, 64 and 65, Figs. 1 and 2, are mounted in the stator 56, Fig. 2, in position to cooperate respectively with brushes 66, 67 and 68, Figs. 4, 9, 10 and 11, mounted in the rotor R1 as shown in these views. The brush 68 is electrically connected to a contact strip 69, Figs. 4 and 11, which is secured to the rotor R1, this same contact strip 69 being also electrically connected to the brush 41, Figs. 1, 4 and 8. Thus the brush 41 is electrically connected to the slip ring 65 at all times.

The brushes 42 and 43 are electrically connected to the slip rings 63 and 64, respectively, through the medium of switches 70 and 71, Figs. 1, 4 and 5 which are mounted on a disc 72 attached to the right-hand end of the rotor R1 as shown in Figs. 4 and 5. These switches are included in the novel features of the present invention and are arranged to be centrifugally operated at predetermined speeds as will hereinafter be described in detail. Thus the switch 70 has contacts which are normally closed until the speed of the shaft 20—1 exceeds a predetermined limit that constitutes or is attained at the upper end of the normal operating range of the shaft as 20—1 that is to be controlled, whereupon the contacts of this switch separate and remain open until the speed of the shaft 20—1 is reduced below this limit. In a similar manner the switch 71 has contacts which are normally open until the speed of the shaft 20—1 exceeds a predetermined limit that constitutes or is reached at the lower end of the normal operating range of the shaft as 20—1 that is to be controlled, whereupon the contacts of this switch close and remain engaged until the speed of the shaft 20—1 is reduced below this limit. The relative values of these speed limits are in most instances such that the switch contacts 71 close at a relatively low speed and the switch contacts open at a relatively high speed so that there is an intermediate range of speeds of the shaft 20—1 throughout which both sets of contacts 70 and 71 are closed.

Referring again to Fig. 4 it may be seen that the contact plate 62 to which the brush 42 is electrically connected is connected by a conductor 75 to one contact of the switch 70, the other contact of this switch being connected by a conductor 76 to a contact plate 77 on the rotor R1. The brush 67, Figs. 1, 4 and 9, is electrically connected to the contact plate 77. Thus the brush 42 is electrically connected to the slip ring 63 through the medium of the switch 70. In a similar manner, as shown in Figs. 1, 4 and 7, the brush 43 is held in place by a plate 43', and the brush 66 is held in place by a plate 66', and these two plates are electrically connected through the medium of the switch 71.

Each of the secondary commutator switches as S1 and S2 is provided with the two centrifugal switches 70 and 71, connected in the manner just described, in the respective circuits for the brushes 42 and 43, while in the case of the master switch MS, however, only the two switches 70A and 71A are arranged to open and close in the same manner as in the secondary switches, the switches 70A and 71A are connected in series in the circuit to the master brush 40. Thus the master brush 40 has its controlling circuit broken when the speed of the master switch is either above or below the desired normal range of operating speeds. As shown in Fig. 1, a wire 78 extends from the brush 66A of the slip ring 63A to one contact of the switch 71A. The other contact of switch 71A is connected by a wire 78' to one contact of the switch 70A, while the other contact of this switch is connected to the brush 40 by a wire 78''.

Each of the slip rings 63, 64 and 65 of the commutator switch S1 is connected by an individual conductor as 78, Figs. 1 and 2, to an individual terminal as 79 in the stator 56. The electrical connections from the slip rings to the control unit as CU1 are brought out from these terminals through conductors such as 45, 46 and 47, Fig. 1, which have been referred to hereinabove, these conductors being received in suitable plug connections generally designated 80 provided for this control unit. In the case of the master switch MS, only the slip ring 63A is utilized and this slip ring is electrically connected to a terminal 79A from which an electrical connection is extended to one pole of the source of direct current voltage generally designated 85 which supplies current to the apparatus, this being designated the negative pole in the present instance.

For the purpose of the present invention the control unit as CU1 may comprise any suitable device which is responsive to control impulses transmitted through the conductors 45, 46 and 47 to correlate the speeds of the master shaft 20—M and the secondary shaft as 20—1. As an illustrative example of such a control unit, I have selected one of the relay units shown in my copending application Serial No. 505,938, filed October 12, 1943, and this selected unit will be described in detail herein. It will be understood, of course, that other relay units such as are disclosed, for example, in the patent to Wilson, No. 2,232,753 could be utilized if desired.

The control unit CU1 shown in Fig. 1 controls the adjusting motor 27 so that a controlled governing mechanism such as the speed varying mechanism 26 may be operated alternatively or selectively in opposite directions. The speed governing mechanism 26 is arranged to govern the speed of a variable speed engine 22 which drives the secondary shaft 20—1, as by adjusting either the fuel supply or the load in a known manner. In the present instance the motor 27 is energized from the source 85 of current, this source having line wires 86 and 87, and these line wires are connected to the various elements of the apparatus through a control panel 88 which affords a manual control switch 89 through which the mechanism may be rendered operative or inoperative. The control panel 88 also includes signal lamps 89A and 90 which are lighted selectively, as will hereinafter be explained, to indicate that the adjusting motor 27 has reached the limit of its travel in one direction or the other.

One side of the circuit is extended from the negative line wire 87 to the brush 40 of the master switch MS by means including a wire 82 extended through the plug socket 51 and another wire 81 to the terminal 79A from which an electrical connection is made as above described through the centrifugal switches 70A and 71A in series to the brush 40. This same side of the circuit is extended by wires 91 and 92 to the common terminal of the field windings 93 and 94 of the adjusting motor 27. The other side of the source 85 is extended from the wire 86 through the switch 89 and a wire 95 to a terminal 97 of the control unit CU1, this connection being through a connector plug 80 to facilitate installation of the apparatus. Circuit is similarly extended from the line wire 87 through the wire 91 and a wire 96A to another terminal 96 in the control unit CU1. The control circuits from the control unit CU1 to the field windings of the motor 27 are arranged to include terminals 98 and 99 which form part of the control unit CU1. Thus, wires 100 and 101 are extended from the terminals 98 and 99 through the connector plug 80 to the field windings 93 and 94, respectively, such wires being extended through connector plug 102 at the motor 27. The wire 100 is connected to the field winding 93 through a limit switch 105 which, when opened by operation of the motor to one limit of its travel, is arranged to engage another contact which extends circuit through a wire 104 to the signal lamp 90, and circuit from this lamp is continued to the line wire 87 by a wire 103. A similar limit switch 106 is interposed between the wire 101 and the field winding 94, and when this switch opens the circuit to the field winding, it is arranged to engage another contact which extends the circuit through a wire 107 to the signal lamp 89A. Thus when the motor reaches one limit of its travel, this condition is indicated by the lighting of the appropriate one or the other of the two signal lamps, and the pilot may then readjust the manual control such as the throttle for the secondary engine as 22, thereby enabling the control apparatus to continue its automatic operation.

The wires 45, 46 and 47 extended from the three brushes 41, 42 and 43 of the commutator switch S1 are connected through the plug 80 to the control unit CU1, and within the control unit CU1 the wire 45 is connected to a terminal 110, the wire 46 is connected to a terminal 111, and the wire 47 is connected to a terminal 112.

The control unit CU1 has a master relay 115 and two secondary relays 116 and 117 which are adapted to be selectively operated under control of the commutator switches MS and S1 in accordance with the detected sense and magnitude of the relative rotation of the switch rotors. The specific relay arrangement illustrated in the control unit CU1 of Fig. 1 is identical to one of the embodiments disclosed in my copending application, Serial No. 505,938, filed October 12, 1943, and reference may be had to such copending application for specific details of structure and function of such relay unit. However, it will be understood that the particular relay units employed may be modified or varied without departing from the spirit of the present invention.

In describing the operation of the control apparatus it will be assumed for present purposes that the master shaft 20M and secondary shaft 20—1 are rotating in a counter-clockwise direction at speeds such that the centrifugal switches 70, 71, 70A and 71A are all closed. This condition will exist when the shafts 20M and 20—1 are operating within the normal speed range. Now let it be assumed that there is a slight discrepancy between the speeds of the shafts 20M and 20—1 within the aforesaid normal speed range, so that the shaft 20—1 turns clockwise relative to the shaft 20M as viewed in Fig. 1. In other words, the shaft 20—1 is turning more slowly than the shaft 20M. This causes the master brush 40 to come into electrical contact with the brushes 43, 41 and 42 in the sequence named. The establishment of an electrical connection between the brushes 40 and 43 may in some instances be without effect, for as will be evident in Fig. 1, and from the specific description of the relay unit as included in my aforesaid application, the operative circuits from the brushes 42 and 43 are preferably maintained open when the speed relationship between the two shafts is within the allowable tolerance.

When the relative positions of the brushes are such that an electrical connection is established from brush 40 to brush 41, current flows from the source 85 through wires 87 and 82, plug connection 51, wire 81, terminal 79A, slip ring 63A, brush 66A, switches 70A and 71A, brush 40 and the engaged commutator segment 26, conductors as 48, 49 and 50, to the correspondingly located commutator segment of the switch S1, the brushes 41 and 68, the conductor 45, the terminal 110, a resistor 119, a wire 118, the winding of the master relay 115, back contacts 121 and 122 of secondary relays 116 and 117, respectively, terminal 97, wire 95, switch 89 and wire 88 to the positive pole of the source 85. The relay 115 energizes upon completion of this circuit and closes its contact 123, thereby conditioning a circuit from the positive terminal 97 to the windings of relays 116 and 117.

When master brush 40 comes into electrical contact with secondary brush 42, a circuit is completed through these brushes, the centrifugal switch 70 and the wire 46 to the terminal 111, thence through wire 123A, back contact 124 of relay 117, wire 120, winding of relay 116, contact 123 of relay 115 to the positive terminal 97. The master relay 115 has slow-to-release characteristics by virtue of a condenser 125 connected across its winding, so that the master relay contact 123 remains closed for a predetermined release period after the energizing circuit for the master relay 115 is broken. Thus, since the aforesaid energizing circuit through the secondary relay 116 includes the contact 123, it will be clear that the secondary relay 116 may be energized and operated only during the release period of the master relay 115. When the circuit for the relay 116 is thus completed during the release period of the master relay, the operation of the secondary relay 116 closes its contacts 126, 127 and 128 and opens its contacts 121 and 129. Opening of contact 129 prevents subsequent energization of relay 117 until the relay 116 has released. Closure of contact 128 connects an adjustable resistor 130 across the winding of master relay 115 so as to reduce the normal release time of the relay 115 as explained in my aforesaid copending application, and this causes the length of the control impulse or the length of the speed adjusting period to be so controlled as to attain the desired readjustment of speed without over-correction. Closure of contact 126 establishes a stick circuit for the relay 116 which is maintained throughout the delay or release period of the relay 115; that is, so long as relay contact 123 stays closed.

Closure of the relay contact 127 establishes a circuit from the positive terminal 97 through back contact 122, the contact 127, the terminal 98, the wire 100, the field winding 93 of the armature of motor 27 and wires 92 and 91 to the negative terminal of the source 85. The adjusting motor 27 is thus energized to rotate in such a direction as to operate the governing mechanism 26 for increasing the speed of the secondary shaft 20—1. This adjusting operation continues until the end of the release period of the master relay 115; and in the event that the speed adjustment thus effected has not returned, the secondary shaft 20—1 to the speed of the master shaft 20M, this fact will be detected and one or more further operations will take place until the speeds of the shafts 20—1 and 20M become so nearly identical that there can no longer be a condition where relays 115 and 116 are concurrently energized. When this equalization is attained, no further controlling action takes place until such time as the apparatus again detects objectionable variation in the speeds of the shafts.

In the preceding description, it has been assumed that the secondary shaft 20—1 was rotating more slowly than the master shaft 20M. It will now be assumed that the speed of the secondary shaft 20—1 exceeds the speed of the master shaft 20M. This causes the master brush 40 to be brought into electrical contact with the secondary brushes 42, 41 and 43 in the sequence named as the shaft 20—1 rotates in a leading or counter-clockwise direction relative to the shaft 20M as viewed in Fig. 1. Establishment of electrical connection between the brushes 40 and 42 is without effect in the present instance, as hereinabove explained with respect to the brush 43.

As the brush 40 moves into electrical contact with the brush 41, circuit is established in the above described manner through the winding of the relay 115, causing this relay to energize and close its contact 123, and this contact will, of course, remain closed for a period determined by the effective release time of the relay 115. As the brush 40 moves into electrical contact with the brush 43, a circuit is established through these two brushes and the centrifugal switches 70A, 71A and 71, back contact 129 of the relay 116, winding of the relay 117 to the relay contact 123, and if such current is established during the release time of the relay 115, circuit is further extended through the closed contact 123 to the positive side of the source 85. The relay 117 thereupon energizes, opening its contacts 122 and 124 and closing its contacts 131, 132 and 133. Opening of the contact 124 prevents the subsequent energization of relay 116 during the time the relay 117 remains energized, while closure of the contact 131 establishes a stick circuit for the relay 117 so that the relay 117 will remain energized until the contact 123 opens at the end of the effective release period of the master relay 115. Closure of the contact 133 places the adjustable resistor 134 across the winding of the relay 115 for controlling and reducing the release period of this relay in the manner described in my aforesaid copending application. Closure of the contact 132 of the relay 117 establishes circuit through the field winding 94 of the motor 27, and this causes the motor 27 to be actuated in such a direction as to adjust the governing mechanism 26 for decreasing the speed of the shaft 20—1. This period of adjustment is maintained throughout the remainder of the effective release period of the master relay 115, and is repeated as required until the shaft 20—1 is rotated at substantially the same speed as shaft 20M.

It will be understood that the circuits just described in connection with the control unit CU1 for adjusting and regulating the speed of the secondary shaft 20—1 are duplicated in a control unit CU2 and the associated apparatus including the switch 32, so that regulation of the speed of the shaft 20—2 is accomplished in a manner similar to that described hereinbefore in relation to the secondary shaft 20—1, and as herein illustrated the primary elements of the control structure associated with the shaft 20—2 have been identified by the same reference characters as heretofore applied, with the suffix "2" added in each instance. It is obvious that this arrangement may be further extended for controlling additional secondary shafts.

In the control apparatus as thus afforded, the characteristics of sensitivity of detection necessary for detection of extremely small speed differences, and the regulation of the length or extent and the periods of corrective adjustment so as to attain rapid correction without danger of over-correction are usually considered to be the primary governing factors that are to be taken into account in the design of the apparatus, but despite the vital importance of these characteristics, the arrangement must in every instance be such as to insure proper operation throughout the entire range of speed differences that may be encountered under the most extreme or unusual conditions encountered in practice, and through the action of the centrifugal or speed responsive switches 70, 71, 70A and 71A, this overall range of proper operation is assured. Thus, when the secondary engine 22 is operating within the normal range of speeds, the two switches 70 and 71 will both be closed, and the control apparatus will operate to correlate the speed of the secondary engine 22 with the speed standard established by the master switch MS as hereinbefore described. However, if some unusual circumstance, such as a stoppage of the fuel line to the engine 22, causes the speed of this engine to fall to a point below the lower limit of the normal operating range, the switch 71 will open so as to thereby disable the brush 43 and the circuit for the speed-decreasing relay 117. Thus, the speed-decreasing function of the control apparatus is disabled during the time that the engine 22 is operating at a speed that is below the normal operating range, and under such circumstances the only corrective action that may be exercised by the control apparatus is to increase the speed of the engine 22, or in other words, the only corrective action that may be applied is one that tends to establish the desired speed of the engine 22.

Similarly, the apparatus of the present invention insures proper corrective action where the speed of the secondary engine 22 exceeds the upper limit of the normal operating range. Thus, where such excessive speed is encountered the switch 70 opens, thereby to disable the brush 42 and the circuit to the speed-increasing relay 116. Thus, the only corrective action that may be exercised by the control apparatus under such circumstances is such as to tend to decrease the speed of the engine 22, or in other words, the only corrective action that may take place under control of the control apparatus will tend to return the engine 22 to the desired speed.

Another circumstance that may be encountered in practice is where the operating means for the master switch MS fails to function in the desired or proper manner. Thus, the motor or engine that drives the master switch MS may fail in such a way as to exceed the upper limit of the normal operating range, and when this occurs, the speed responsive switch 70A opens at the time when the upper limit of the normal speed range is reached, or slightly above this upper limit. When the switch 70A is thus opened, the master brush 40 is disabled and the control apparatus as a whole is disabled. Hence, the speed-increasing action that would normally result from such undesired speed increase of the master switch MS will terminate at substantially the upper limit of the normal speed range, so that engine damage and any other undesired results that might otherwise be caused by such abnormal speed increase of the controlling means are effectually avoided.

Similarly, if the motor or engine that drives the master switch MS fails in such a way that its speed falls below the desired range, the speed responsive switch 71A will open, and the master brush 40 will be disabled. Hence the undesired speed-decreasing action that would otherwise be exerted on the secondary engines cannot take place when the master motor or engine fails in the manner just described.

From the foregoing description it will be seen that each control unit as CU1 is capable of operating in such a manner as to increase or decrease the speed of the corresponding secondary shaft as 20—1 in accordance with the relative speeds of rotation of the shafts 20M and 20—1 within the predetermined normal range of speeds of the shaft as 20—1. In the event the speed of the shaft 20—1 is outside this range, the control unit CU1 is prevented from operating to further aggravate any condition of unbalance between the speeds of the two shafts. Thus, if the shaft 20—1 is operating above the upper speed limit of this range, the control unit CU1 is automatically conditioned in such a manner that it can only operate to reduce the speed of this shaft so as to bring its speed within the normal range. Likewise, if the speed of the shaft 20—1 is reduced below the lower limit of the speed range, the control unit CU1 is conditioned in such a manner that it can only function to increase the speed of the shaft. If the speed of the master shaft increases or decreases objectionably so as to be outside the limits of the normal operating range, the contacts 70A or 71A open and disable the entire control apparatus.

Thus, it will be evident that the present invention enables control apparatus of the character to which this invention relates to detect and correct relative speed differences whether such speed differences be large or small, and that the invention enables sensitivity to small speed differences in such control apparatus to be retained in a degree comparable to that attained in the apparatus of my aforesaid application while enabling such apparatus to detect and correct large speed differences. It will also be clear that this invention enables such control apparatus to be constructed so as to be particularly efficient and sensitive within the normal range of operating speeds of the controlled shaft or shafts, and enables appropriate portions of such control apparatus to function to bring the controlled shaft into this normal speed range. Moreover, the present invention enables the speed of a secondary shaft to be adjusted in response to the speed differential between the master shaft and the secondary shaft when the secondary shaft is within the normal operating speed range and enables the apparatus to adjust the speed of the secondary shaft in accordance with its actual speed when such actual speed of the secondary shaft is outside of the normal operating speed range.

Hence, while I have illustrated and described a preferred embodiment of my invention it is to be understood that this is capable of variation and modification and I therefore do not wish to be limited to the precise details set forth, but desire to avail myself of such changes and alterations as fall within the purview of the following claims.

I claim:

1. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined time and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, and means responsive to the speed of said secondary shaft and controlling said adjusting means to prevent operation of said adjusting means under control of said master device and a selected one of said secondary devices when the speed of said secondary shaft is outside of a predetermined normal range of speeds.

2. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined time and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, and means responsive to the speed of said secondary shaft for disabling said one secondary device when the speed of said secondary shaft is greater than a predetermined normal maximum speed.

3. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined time and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, and means responsive to the speed of said secondary shaft for disabling said second secondary device when the speed of said secondary shaft is less than a predetermined normal minimum speed.

4. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined time and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, first means responsive to the speed of said secondary shaft and effective to disable said one secondary device when the speed of said secondary shaft is above a normal predetermined speed range, and second means responsive to the speed of said secondary shaft to disable said second secondary device when the speed of said secondary shaft is below said normal predetermined speed range.

5. In a control apparatus for correlating the speeds of a master shaft and an independently driven secondary shaft to attain substantially a predetermined speed relationship therebetween, detecting means associated with said shafts to compare the speed of said master and secondary shafts, adjusting means operable in opposite directions to variably adjust the operating speed of said secondary shaft, governing means controlled by said detecting means and effective to operate said adjusting means in one direction for increasing the speed of said secondary shaft when the speed of said secondary shaft is below the speed of said master shaft, other governing means controlled by said detecting means and effective to operate said adjusting means in the opposite direction for decreasing the speed of said secondary shaft when the speed of said secondary shaft is above the speed of said master shaft, and means responsive to the speed of said master shaft for disabling said control apparatus when the speed of said master shaft is outside a predetermined speed range.

6. In a control apparatus for correlating the speeds of a master shaft and an independently driven secondary shaft to attain substantially a predetermined speed relationship therebetween, detecting means associated with said shafts to compare the speeds of said master and secondary shafts, adjusting means operable in opposite directions to variably adjust the operating speed of said secondary shaft, governing means controlled by said detecting means and effective to operate said adjusting means in one direction for increasing the speed of said secondary shaft when the speed of said secondary shaft is below the speed of said master shaft, other governing means controlled by said detecting means and effective to operate said adjusting means in the opposite direction for decreasing the speed of said secondary shaft when the speed of said secondary shaft is above the speed of said master shaft, and means responsive to the speed of said master shaft to render said governing means selectively ineffective when the speed of said master shaft is outside a predetermined range of speeds.

7. In a control apparatus for correlating the speeds of a master shaft and an independently driven secondary shaft to attain substantially a predetermined speed relationship therebetween, detecting means associated with said shafts and operable to compare the speeds of the master and secondary shafts, said detecting means including at least three electrical circuits arranged for sequential closure at a frequency determined by the magnitude of the variance from said predetermined speed relationship and in different sequence in accordance with the sense of such variance, adjusting means operable in opposite directions to variably adjust the operating speed of said secondary shaft, at least three relays, one of which relays is connected in one of said electrical circuits and constitutes a master relay and the other two of which constitute first and second secondary relays and are connected respectively in the other two of said electrical circuits, means associated with said master relay to impart a normal slow-release period thereto of predetermined length, first and second control circuits for said adjusting means for causing operation of said adjusting means selectively in opposite directions, means operable to close said first control circuit when said first secondary relay is operated at a time when said master relay is in its operated condition, means operable to close said second control circuit when the second of said secondary relays is operated at a time when said master relay is in its operated condition, means operable as an incident to the closure of one of said control circuits to reduce the normal release period of said master relay, and means responsive to the speed of said secondary shaft and controlling said adjusting means to prevent operation of said adjusting means under control of selected of said relays when the speed of said secondary shaft is outside a predetermined range of speeds.

8. In a control apparatus for correlating the speeds of a master shaft and an independently driven secondary shaft to attain substantially a predetermined speed relationship therebetween, detecting means associated with said shafts and operable to compare the speeds of the master and secondary shafts, said detecting means including at least three electrical circuits arranged for sequential closure at a frequency determined by the magnitude of the variance from said predetermined speed relationship and in different sequence in accordance with the sense of such variance, adjusting means operable in opposite directions to variably adjust the operating speed of said secondary shaft, at least three relays, one of which relays is connected in one of said electrical circuits and constitutes a master relay and the other two of which constitute first and second secondary relays and are connected respectively in the other two of said electrical circuits, means associated with said master relay to impart a normal slow-release period thereto of predetermined length, first and second control circuits for said adjusting means for causing operation of said adjusting means selectively in opposite directions, means operable to close said first control circuit when said first secondary relay is operated at a time when said master relay is in its operated condition, means operable to close said second control circuit when the second of said secondary relays is operated at a time when said master relay is in its operated condition, means operable as an incident to the closure of one of said control circuits to reduce the normal release period of said master relay, and means responsive to the speed of said master shaft and controlling said detecting means to render said relays ineffective when the speed of said master shaft is above the upper limit of a predetermined range of speeds.

9. In a control apparatus for correlating the speeds of a master cyclically operating element and an independently driven secondary cyclically operating element to attain substantially a predetermined speed relationship therebetween, detecting means for comparing the speeds of said elements and comprising means affording at least three electric circuits and at least two electrical switch devices operatively associated with said elements, said switch devices being effective to energize said circuits at differential times in a sequence determined by the sense of relative movement of said elements and at a rate according to the magnitude of the variance from said predetermined speed relationship, governing means normally controlled by said detecting means for selectively increasing or decreasing the speed of said secondary element to attain said predetermined speed relationship, and means responsive to the actual speed of said secondary element for modifying the controlling effect of said detecting means upon said governing means when the speed of said secondary element is outside of a predetermined normal range of speeds.

10. In a control apparatus for correlating the speeds of a master cyclically operating element and an independently driven secondary cyclically operating element to attain substantially a predetermined speed relationship therebetween, detecting means for comparing the speeds of said elements and comprising means affording a plurality of electric circuits and electrical switch devices operatively associated with said elements, said switch devices being effective to energize said circuits at differential times in a sequence determined by the sense of relative movement of said elements and at a rate according to the magnitude of the variance from said predetermined speed relationship, and governing means including selectively operable speed-increasing means and speed-decreasing means controlled by said detecting means to adjust the speed of said secondary element to attain said predetermined speed relationship, means responsive to the actual speed of said secondary element to disable said speed-increasing means when the speed of said secondary element is above said range and to disable said speed-decreasing means when the speed of said secondary element is below said range.

11. In a control apparatus for correlating the speeds of a master cyclically operating element and an independently driven secondary cyclically operating element to attain substantially a predetermined speed relationship therebetween, detecting means for comparing the speeds of said elements and comprising means affording a plurality of electric circuits and electrical switch devices operatively associated with said elements, said switch devices being effective to energize said circuits at differential times in a sequence determined by the sense of relative movement of said elements and at a rate according to the magnitude of the variance from said predetermined speed relationship, governing means including selectively operable speed-increasing means and speed-decreasing means controlled by said detecting means to adjust the speed of said secondary element to attain said predetermined speed relationship, means responsive to the actual speed of said secondary element to disable said speed-increasing means when the speed of said secondary element is above said range.

12. In a control apparatus for correlating the speeds of a master cyclically operating element and an independently driven secondary cyclically operating element to attain substantially a predetermined speed relationship therebetween, detecting means for comparing the speeds of said elements and comprising means affording a plurality of electric circuits and electrical switch devices operatively associated with said elements, said switch devices being effective to energize said circuits at differential times in a sequence determined by the sense of relative movement of said elements and at a rate according to the magnitude of the variance from said predetermined speed relationship, governing means including selectively operable speed-increasing means and speed-decreasing means controlled by said detecting means to adjust the speed of said secondary element to attain said predetermined speed relationship, means responsive to the actual speed of said secondary element to disable said speed-decreasing means when the speed of said secondary element is below said range.

13. In a control apparatus for correlating the speeds of a master cyclically operating element and an independently driven secondary cyclically operating element to attain substantially a predetermined speed relationship therebetween, detecting means for comparing the speeds of said elements and comprising means affording a plurality of electric circuits and electrical switch devices operatively associated with said elements, said switch devices being effective to energize said circuits at differential times in a sequence determined by the sense of relative movement of said elements and at a rate according to the magnitude of the variance from said predetermined speed relationship, governing means normally controlled by said detecting means for adjusting the speed of said secondary element to attain said predetermined speed relationship, and means responsive to the actual speed of said master element for suspending the controlling effect of said detecting means upon said governing means when the speed of said master element is outside of a predetermined speed range.

14. In a control apparatus for correlating the speeds of a master shaft and an independently driven secondary shaft to attain substantially a predetermined speed relationship therebetween, detecting means associated with said shafts to compare the speeds of said master and secondary shafts, adjusting means controlled by said detecting means in accordance with the detected speed differential to adjust the operating speed of said secondary shaft selectively in one direction or the other for establishing said predetermined speed relationship, and means responsive to the speed of said master shaft for disabling said control apparatus when the speed of said master shaft is outside a predetermined speed range.

15. In a control apparatus for correlating the speeds of a master shaft and an independently driven secondary shaft to attain substantially a predetermined speed relationship therebetween, detecting means associated with said shafts to compare the speeds of said master and secondary shafts, adjusting means normally operable in opposite directions under control of said detecting means to variably adjust the operating speed of said secondary shaft, establish said predetermined speed relationship, and means dominating such normal operation of said adjusting means and responsive to the speed of said secondary shaft to modify such controlling action when the speed of said secondary shaft is outside a predetermined range of speeds.

ROSSER L. WILSON.

REFERENCES CITED

The following references are of record in the file of this patent:

UNITED STATES PATENTS

| Number | Name | Date |
| --- | --- | --- |
| 690,248 | Duane | Dec. 31, 1901 |
| 1,739,055 | Bartley et al. | Dec. 10, 1929 |